I. RULOFSON.

Plow.

No. 863. Reissued Dec. 13, 1859.

Witnesses:

J Dalir Hatton

D S Wagener

Inventor:

Isaac Rulofson

AM. PHOTO-LITHO. CO. N.Y. (OSBORNE'S PROCESS.)

UNITED STATES PATENT OFFICE.

ISAAC RULOFSON, OF PENN YAN, NEW YORK, ASSIGNOR TO HIMSELF AND LEMUEL HARVEY, OF SAME PLACE.

IMPROVEMENT IN PLOWS.

Specification forming part of Letters Patent No. 23,116, dated March 1, 1859; Reissue No. 863, dated December 13, 1859.

*To all whom it may concern:*

Be it known that I, ISAAC RULOFSON, of Penn Yan, in the county of Yates and State of New York, have invented a new and useful Improvement in Plows; and I do hereby declare that the following is a full, clear, and exact description of the construction and operation of the same, reference being had to the accompanying drawings, making a part of this specification, in which—

Figure 5:
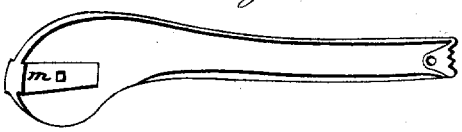
Figure 4:
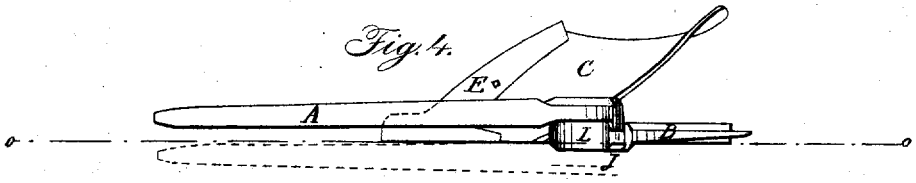
Figure 1:
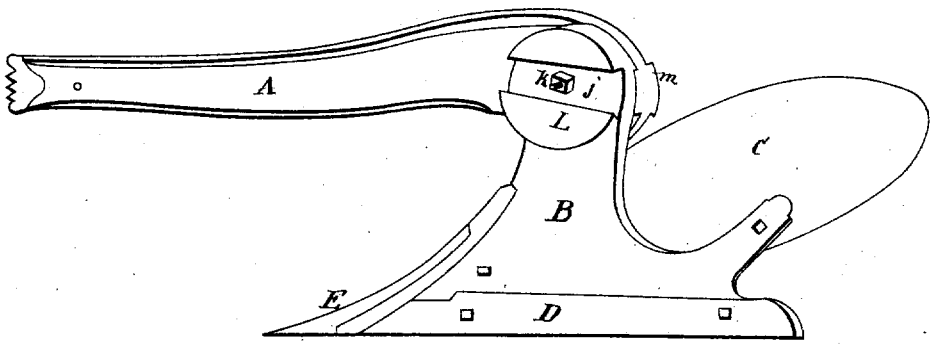
Figure 2:
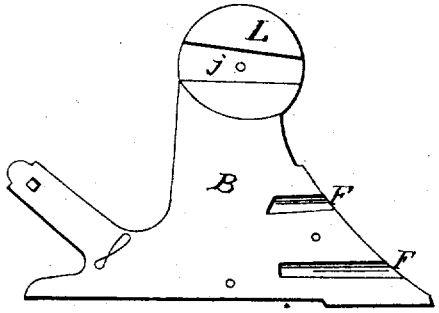
Figure 3:
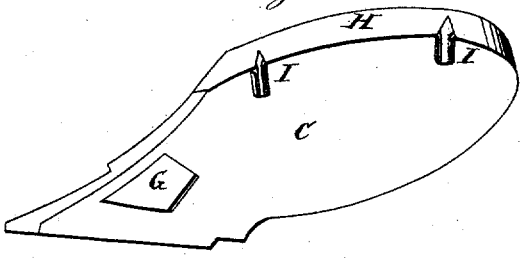

Figure 1 is a perspective view of the plow with the handles removed. Fig. 2 is a reverse or inside view of the landside or standard. Fig. 3 is a view of the inside of the mold-board separately shown. Fig. 4 is a plan view of the plow, showing the method of adjusting the beam. Fig. 5 is a perspective view of the beam detached.

Similar letters refer to corresponding parts in all the figures.

As represented in the drawings, B is the landside portion of the plow, its lower edge being provided with the usual landside-strip, D, and its upper part constituting a standard for the support of the beam A, and to which alone it is attached. Its thickness is increased on each side in the form of a head having a circular outline, L, in either side of which is formed a dovetailed recess, *j*, having a horizontal direction, or nearly so, across the head, and diminishing in breadth from the rear to the front side.

The beam A may be of cast-iron or other material, the forward end being constructed of any form that is best adapted to the purpose. The rear end is made of a size and shape to correspond with the head L of the standard, and is provided on each side with dovetailed projections *m m*, corresponding in size and shape with the recesses *j*. The beam is attached by inserting one of these projections in its corresponding mortise or recess and crowding it forward until the wedging form of the parts, which are accurately fitted, insures a very firm connection, the beam being held in close contact with the broad flat surface of the head L, whereby it cannot twist or work loose, and the strength of the union is increased by the draft-strain to which it is subjected, an increase of which draws the parts into closer union. A bolt, *k*, is passed through a hole in the standard and a corresponding hole in the beam, but is not designed to receive any portion of the strain, but merely to keep the parts, together when not in use. This forms a very simple and firm method of uniting the parts, and one of economical construction; but it is chiefly designed for adjusting the relative position of the beam of the plow to adapt it for using by two or three horse teams. This is ordinarily done by a clevis or by pivoting the beam to the standard, so as to turn in the same manner and throw the point at which the whiffletrees are attached more upon the landside, so as to place the off horse of a team in the furrow. These methods are attended with obvious disadvantages, inasmuch as the line of draft is thus made to diverge from the direction of the land side of the plow or line of its motion, thus producing a constant tendency of the plow to turn or twist in the furrow, making the draft harder and severely straining the implement, as well as increasing the labor of the plowman in guiding it properly. But with my method of construction it is only necessary to remove the beam from the mold-side to the land side of the standard, as indicated by the dotted lines in Fig. 4, to change it from a two-horse to a three-horse plow, while the line of its direction remains parallel with the land side of the implement and with the line of draft, as shown by the red line *o o*. The point is attached in the same line of direction, and the easiest draft consistent with the weight and resistance to be overcome is thereby secured.

The mold-board C is of ordinary construction on the furrow side; but on the reverse or land side is provided a projection, G, which is narrower at its rear end than at its union with the mold-board. Its sides are united and fitted to the lugs F F on the inner or reverse side of the land-side portion B, forming a dovetailed connection therewith similar to that before described. By this connection alone the mold-board is attached to the landside. The handles are attached to each in the ordinary manner.

An extension-piece, H, is attached to the top of the mold-board by means of projections taking into dovetailed mortises in the lugs I I. This may be applied and removed at pleasure when required, its use being to enlarge the mold-board when plowing deep or when the soil would otherwise fall over its top.

What I claim as my invention, and desire to secure by Letters Patent, is—

Moving and adjusting the beam A laterally upon the standard B by means of the head L and dovetailed connections *m m* and *j j*, or their equivalents, in such a manner that the line of draft or direction of the beam shall always remain parallel with the land side of the implement, substantially as and for the purposes herein shown and described.

ISAAC RULOFSON.

Witnesses:

I. DATER HUTTON,

D. S. WAGNER.